United States Patent Office 2,711,230
Patented June 21, 1955

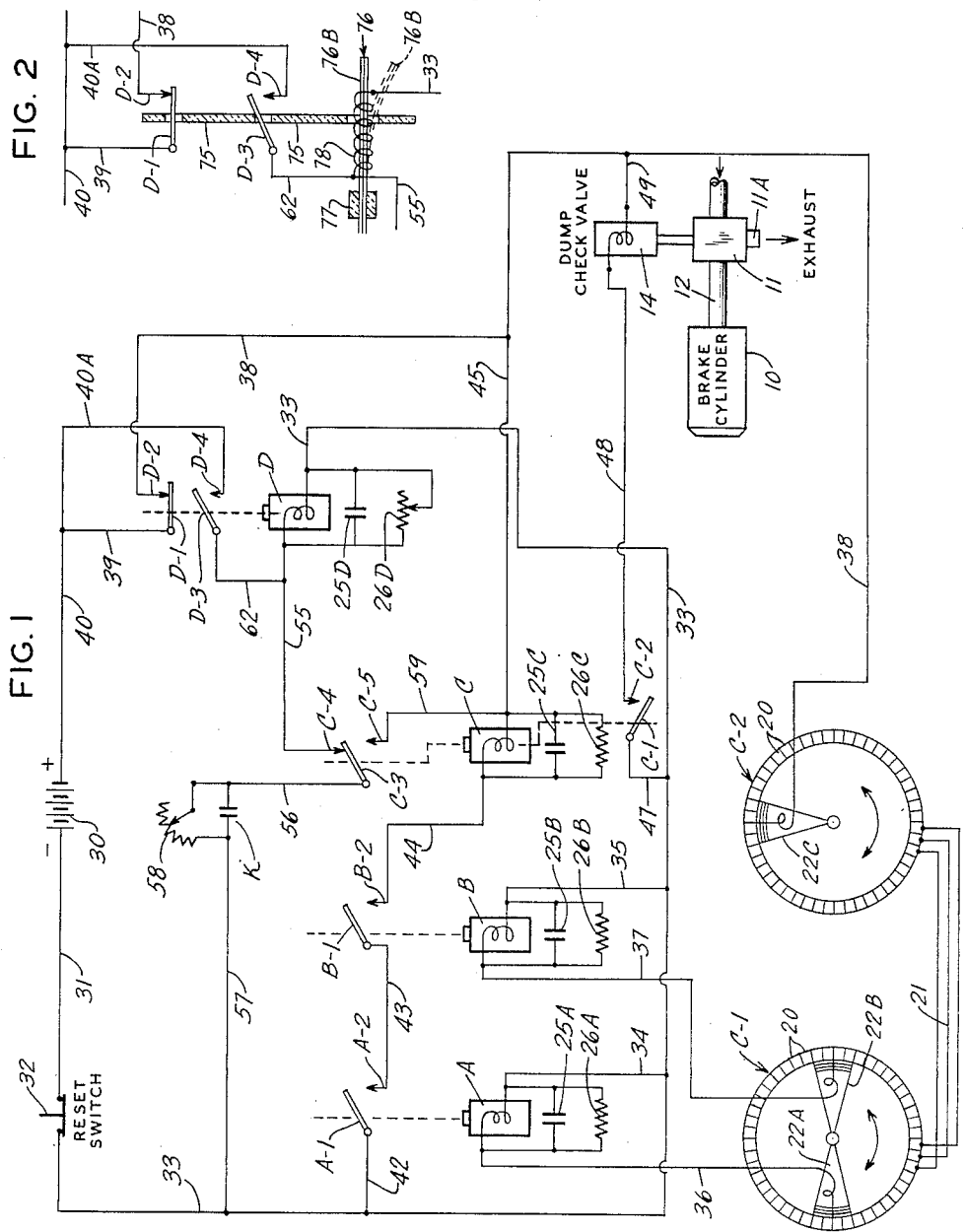

2,711,230

ANTI-WHEEL-SLIDE SAFETY CONTROL APPARATUS

Rosser L. Wilson, Mahwah, N. J., assignor to American Brake Shoe Company, Wilmington, Del., a corporation of Delaware Application April 5, 1951, Serial No. 219,465

4 Claims. (Cl. 188—181)

The present invention relates to control apparatus and particularly to control apparatus for governing the operation of braking mechanism in railway and like vehicles.

In the operation of railway equipment, one of the most troublesome problems encountered is the sliding of the wheels in the course of a braking operation and this sliding of wheels of course occurs most frequently in relatively heavy braking operations such as emergency application of the brakes. The natural result of such sliding is the production of flat wheels on the railway equipment, and many expedients have been proposed for reducing or preventing this undesired sliding of the wheels. In several of my prior patents which will be specifically enumerated hereinafter, I have disclosed and claimed control apparatus which in practice has been quite successful in reducing the number of flat wheels in normal railway operation, and in connection with my work in this regard it has become increasingly apparent that while apparatus of this character has great value in preventing damage to the wheels of the railway equipment, it should nevertheless be of such a character that the ultimate effectiveness of the braking equipment is maintained at a safe level at all times. It is with this aspect of equipment of this general character that the present invention is concerned.

My prior control apparatus for governing the braking equipment on railway cars and the like is disclosed in several different forms in my prior Patents Nos. Re. 22,026, 2,232,750, 2,232,752, 2,272,872, 2,320,809, and 2,335,984. As shown in such prior patents, an advantageous control of the slipping action in the wheels of railway equipment may be attained by comparing the rotative speeds of two independently rotatable wheels on such railway equipment during a braking operation to determine whether or not such wheels are rolling at substantially the same rail speed, and where an objectionable difference is detected between the speeds of the two wheels that are being compared, the braking pressure is reduced or released for a predetermined and relatively short time to enable the wheels to return to a free rolling movement. As shown in my aforesaid patents, this may be attained through the use of a control relay panel that is operated in accordance with the sensing action of detecting means associated with the two wheels that are being compared as to speed, and the relay panel is effective to attain the comparing action and to control the braking pressure.

In such equipment it was heretofore recognized that if the braking pressure were released for too long a period, the operation of the railway equipment might be considered to be hazardous because of lack of effective braking power, and in my prior Patent No. 2,272,872, patented February 10, 1942, means were afforded for re-applying the brakes and rendering the control apparatus ineffective in the event that the brakes were maintained in their released condition for an excessively long period.

I have, however, discovered that the aforesaid condition that is discussed in my Patent No. 2,272,872, does not constitute the only unsafe condition that may arise, it being noted that in the event that control apparatus of the aforesaid character repeatedly releases the brakes at an excessive frequency, then the overall braking power of the railway apparatus may be reduced beyond a safe level, and to correct such a condition when it arises is the primary object of the present invention. More specifically stated, it is the object of the present invention to sense the frequency of operation of brake release means in devices of the aforesaid character and to render the control apparatus ineffective in the event that the frequency of the brake releasing operations indicates a possibility of interference with efficient and safe brake operation.

Other and further objects of the present invention will be apparent from the following description and claims and are illustrated in the accompanying drawing which, by way of illustration, shows preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawing:

Fig. 1 is a schematic drawing illustrating a brake control apparatus embodying the features of the invention; and Fig. 2 is a fragmental schematic view illustrating a modified form of the present invention.

For purposes of disclosure the invention is illustrated in Fig. 1 of the drawing as embodied in a control apparatus adapted for governing the braking operation of the brake equipment on railway cars and the like. This control apparatus is arranged to release the braking pressure in a brake cylinder 10 by operation of a dump-check valve 11 that is included in the air supply line 12 of the brake cylinder 10. The dump-check valve 11 is arranged normally to connect the conventional brake control air lines to the brake cylinder 10, but when the valve 11 is actuated by means such as an operating solenoid 14, the supply of pressure air from the usual source is cut off, and the pressure air within the brake cylinder 10 is vented through a vent line 11A.

The normal control of the dump-check valve 11 is attained under the present invention by means which are in their basic relationships quite similar to the control apparatus illustrated in my aforesaid prior patents, but under and in accordance with the present invention, the control operation of such control apparatus is modified and governed by a safety governing means which renders the entire control system ineffective in the event that the frequency of brake releasing operations becomes objectionably high.

Thus as shown in Fig. 1, detecting means are provided in the form of commutators C–1 and C–2 which are associated with a pair of axles of the railway equipment, such axles being the ones to which braking forces are applied by the brake cylinder 10. The commutators C–1 and C–2 may take the form illustrated in my aforesaid Patent No. 2,320,809 and may be associated with the journal box and the axle in each instance in the manner illustrated in such patent. For purposes of the present disclosure it should be pointed out that each commutator includes a plurality of similar contact segments 20, there being 48 such segments in each commutator as herein illustrated. The contact segments 20 are insulated from each other, and the corresponding contact segments in the two commutators are electrically interconnected by means of wires 21, only certain of which are illustrated herein.

The commutator C-1 includes two brushes 22A and 22B that cooperate with the contact or commutator segments 20 thereof, and these two brushes are spaced apart so as to engage the commutator segments at diametrically opposite points. The commutator C-2 has a single brush 22C associated therewith, and it should be observed that the brushes 22A and 22B are driven by the axle with which the commutator C-1 is associated while the brush 22C is driven by the axle with which the commutator C-2 is associated.

The detecting means afforded by the commutators C-1 and C-2 afford means which, by the position of their respective brushes, are representative of the rotative positions of the axles with which they are associated, and means are associated with the two commutators for comparing the speeds of the two axles so as to thereby determine when a slipping condition is present in one or the other of these two axles. The speed comparing means are afforded by a relay panel that includes relays A and B that have similar characteristics and functions, and a relay C that is in effect a power relay which is governed by the combined action of the relays A and B and which in turn governs, among other things, the operation of the dump-check valve 11.

The relays A and B are both arranged to embody slow-to-release characteristics. Thus the relay A has a condenser 25A and a resistance 26A connected in parallel with each other and across the operating coil of the relay. Similarly, the relay B has a condenser 25B and a resistance 26B connected in parallel with each other and across the operating coil of the relay. The relay A has a normally open movable contact A-1 that is arranged to be actuated into contact with a stationary relay contact A-2. Similarly, the relay B has a normally open movable relay contact B-1 that is adapted to be actuated into engagement with a stationary contact B-2.

The relay C is in the present instance also arranged to have slow-to-release characteristics, and for this purpose has a condenser 25C and a resistance 26C connected in parallel with each other and across the winding of the relay. The relay C has a normally open movable relay contact C-1 that is adapted to be actuated into engagement with a stationary relay contact C-2. In addition, the relay C has a movable relay contact C-3 that normally engages a stationary contact C-4 and which upon operation of the relay C is disengaged from the contact C-4 and is engaged with the contact C-5.

Under the present invention, another relay D is provided which functions in the safety control operation as will hereinafter be described. This relay also has slow-to-release characteristics which are imparted thereto by a condenser 25D and a variable resistance 26D connected parallel with each other and across the coil of the relay D. The relay D has a first normally closed movable contact D-1 which is normally engaged with a stationary contact D-2 and is arranged to be disengaged from the contact D-2 upon operation of the relay D. A second movable relay contact D-3 is also afforded on the relay D and this contact is normally open and upon operation of the relay D is adapted to engage a stationary contact D-4.

Electrical power for the operation of the various relays thus described may be afforded from a source such as a battery 30 from which a wire 31 is extended to a normally closed push-button reset switch 32, a wire 33 being extended from the other side of the switch 32. A branch lead 34 is extended from a wire 33 to one terminal of the operating coil of the relay A and a branch lead 35 is similarly extended from the wire 33 to one terminal of the operating coil of the relay B. The other terminal of the operating coil of the relay A is connected by a wire 36 to the brush 22A of the commutator C-1 while the other terminal of the relay B is connected by a wire 37 to the brush 22B. The brush 22C is connected by a wire 38 to the contact D-2 of the relay D, the contact D-1 being connected by wires 39 and 40 in series to the other terminal of the battery 30. Thus it will be evident that so long as the contact D-1 remains in its closed position, the circuits for operating the relays A and B may be closed in accordance with the relative positions of the several brushes of the two commutators, the interconnecting wires 21 serving of course in affording such energizing circuits for the relays A and B.

The manner in which these energizing circuits for the relays A and B are completed is fully described in my aforesaid prior patents, and will be described in some detail hereinafter. It may be pointed out at this time, however, that the relay C is energized only when the contacts of the relays A and B are in their closed position at the same time, it being noted that the relays A and B are in every instance operated successively and that concurrent closure of the contacts thereof is attained by reason of the slow-to-release characteristics of such relays. Thus it will be observed that a wire 42 extends from the wire 33 to the contact A-1 while a wire 43 extends between contacts A-2 and B-1. A wire 44 extends from the contact B-2 to one terminal of the operating coil of the relay C and a wire 45 extends from the other terminal of this relay to the wire 38. Thus when the relay contacts A-1 and B-2 are closed at the same time the relay C will be operated. Upon such operation of the relay C, the contact C-1 is moved to its closed position and this is arranged to close an operating circuit for the valve operating solenoid 14. Thus a wire 47 connects the wire 33 to the contact C-1 while a wire 48 extends from the contact C-2 to one terminal of the solenoid 14, a wire 49 being extended from the other terminal of this solenoid to the wire 38.

Thus when the relay contacts of the relays A and B are in their closed or operated positions at the same time, the relay C is operated so as to energize the solenoid 14 and thereby operate the dump-check valve 11. This releases the brakes and such release of the brakes is maintained for a minimum period that is determined by the slow-to-release characteristics that have been embodied in the relay C.

In the operation of the control apparatus, any relative rotation between the wheels or axles is effective to establish energizing circuits successively through the relays A and B, and the frequency with which such relays are successively energized is a direct measure of the relative speed of the two axles. Thus for purposes of illustration it may be assumed that the brush 22C is rotating in a clockwise direction relative to the brushes 22A and 22B, and when such relative rotation causes the brushes 22A and 22C to be located in the same rotative position, a circuit is established through the relay A, and as the relative rotation continues, this circuit will be broken. The relay A, however, will remain in its operated condition due to the slow-to-release characteristics that have been imparted thereto, and in the event that the relative rotation of the two shafts is of a relatively low or unobjectionable character, the relay A will release prior to the completion of a circuit through the brushes 22B and 22C to the relay B. If, however, the rate of relative rotation is objectionably high so as to be indicative of a slipping condition in the wheel or axle that is associated with the commutator C-1, then the energizing circuit through the relay B will be established prior to the time when the relay A releases. The contacts A-1 and B-1 will thus be closed at the same time and the relay C will be energized so as to thereby cause the dump valve to be operated. The dump valve 11 will be maintained in its operated condition for a period that is determined by the release period of the relay C and upon release of the relay C, the valve 11 is returned to its normal condition and the brakes are re-applied. Such a brake releasing and re-applying operation may occur many times in succession if a continued tendency toward wheel slipping or sliding is detected.

Thus far the operation of the control apparatus as herein described is substantially the same as the operation of the control apparatus disclosed in my aforesaid prior patents, but in the present structure this controlling operation is modified and terminated in the event that the brake releasing operations are repeated at an objectionable frequency. Such disabling of the control apparatus is attained through energization of the relay D and this operation of the relay D is under the present invention arranged to take place when the frequency of operation of the control apparatus exceeds a predetermined maximum. Thus one terminal of the operating coil of the relay D is connected to the wire 33, while a wire 55 is extended from the other terminal of the relay to the contact C–4. This circuit is extended from the contact C–3 by a wire 56 that is connected to one terminal of a condenser K, the other terminal of which is connected to the wire 33 by a wire 57. The condenser K has a variable resistance 58 connected across its terminals for purposes that will appear hereinafter. The condenser K is arranged to have a charge applied thereto each time the relay C is operated and for this purpose the contact C–5 is connected by a wire 59 to the wire 45. Hence, when the relay C is operated, the contact C–3 connects the condenser K across the battery 30 so that the condenser K will be charged. Upon release of the relay C, however, the contact C–3 returns to its normal engagement with the contact C–4 and the condenser is thus connected across the operating coil of the relay D. This circuit includes the wires 57 and 33 from the condenser K to one terminal of the relay D and the wire 55, the contacts C–4 and C–3 and the wire 56 to the other terminal of the condenser K. The capacity of the condenser K is selected at such a value that a single charge on the condenser K will be insufficient to operate the relay D, but where the condenser K is successively charged and then discharged through the relay D at a relatively high frequency of operation, the successive applications of the condenser charge to the relay D will result in operation of the relay D. When this takes place, the contact D–1 is shifted to its open position thus to disable the relays A, B and C and the operating solenoid 14, and at this same time, the relay contact D–3 is moved to its closed position and this is effective to establish a holding circuit for the relay D. Thus an extension 40A of the wire 40 is connected to the contact D–4 while a wire 62 is extended from the contact D–3 to the wire 55. The contact D–3 establishes a holding circuit for the relay D and this holding circuit includes the normally closed reset switch 32. The operation is thus such that the control apparatus will be maintained in its ineffective or disabled condition until such time as the reset switch is actuated. This serves to break the holding circuit for the relay D and the contacts thereof then assume their normal positions as shown in Fig. 1 in the drawing.

In the embodiment of the invention illustrated in Fig. 1 of the drawing, the movable switch elements D–1 and D–3 are actuated by what amounts to a solenoid which forms part of the relay D, but it will be recognized that these relay contacts may also be operated by electrically energized elements of other types. Thus as shown in Fig. 2 of the drawing, the movable switch elements D–1 and D–3 are interconnected by a rigid insulating element 75 and this element is operatively connected to the movable portion of a thermal actuating element 76. This thermal actuating element 76 comprises a bi-metallic member 76B that is anchored at one end in a rigid insulating support 77. The bi-metallic element 76B has a heating coil 78 in surrounding and heat transmitting relationship and one end of this coil is connected at the juncture of the wires 62 and 55 while the other end of the heating coil 78 is connected to the wire 33. Thus the heating element 78 has essentially the same circuit connections as the operating coil of the relay D, and in the operation of the control apparatus, the condenser K will be discharged through the heating coil 78. In the event that the frequency of the control operations becomes too great, the repeated and relatively frequent discharge of current from the condenser K through the heating coil 78 serves to heat the bi-metallic element 76B so as to thereby cause this element to move with a bending action toward the dotted line position shown in Fig. 2. This serves to open the movable contact D–1 so as to thereby disable the control apparatus. This assures return of the braking equipment to its full braking power. The disabled condition of the control is maintained in this instance by the circuit that is closed by the contact D–3, this circuit serving to continue the flow of current from the source through the heat coil 78. When it is desired to return the control apparatus to its operative condition, this may be accomplished by holding the reset switch 32 in an open condition for a time sufficient to allow cooling of the bi-metallic element 76B.

From the foregoing description it will be apparent that the present invention affords a control apparatus for braking equipment whereby safety of operation is attained. More specifically it will be evident that the apparatus of the present invention acts automatically to prevent further brake releasing operations in the event that the frequency of such brake releasing operations has been excessive.

Thus while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a safety control for association with control means of an anti-wheel slide apparatus wherein said control means is effective when operated to release a brake means and is effective when disabled to cause reapplication of such brake means, said safety control comprising, frequency determining means operable concurrently with said control means in each control operation of said control means to effectually measure the frequency of such control operations, and safety governing means automatically effective under control of said frequency determining means to initiate reapplication of the brakes on the wheel when an objectionable frequency of operation of said control means is present to initiate reapplication of the brake means and at the same time to disable said control means.

2. In a safety control for association with control means of an anti-wheel slide apparatus wherein said control means is effective when operated to release a brake means and is effective when disabled to cause reapplication of such brake means, said safety control comprising, electrically operated frequency determining means governed by said control means to determine when the frequency of operation of said control means exceeds a predetermined objectionable amount, and safety governing means automatically effective under control of said frequency determining means to initiate reapplication of the brake means when such frequency exceeds said amount and at the same time to disable said control means.

3. Vehicle brake control apparatus comprising, in combination, means operable to detect a slipping condition in a vehicle wheel, control means controlled by said detecting means for automatically effecting release of the brakes associated with the wheel when the wheel begins to slip and effective thereafter, in its normal manner of operation, to initiate reapplication of the brakes on the wheel, electrically operated frequency determining means governed by said control means to determine when the frequency of operation of said control means exceeds a predetermined objectionable amount, safety governing means automatically effective under control of said frequency determining means to initiate reapplication of the brakes on the wheel when such frequency exceeds said amount and at the same time to disable said control means, and means rendered effective as an incident to such disabling of the control means to maintain said control means in its disabled condition.

4. In a safety control for association with control means of an anti-wheel slide apparatus wherein said control means is effective when operated to release a brake means and is effective when disabled to cause reapplication of such brake means, said safety control comprising, a condenser, a relay and a source of electrical energy, two electrical circuits including a common portion and in which common portion said condenser is connected and in the other portions of which circuits said relay and said source are respectively included, switch means shiftable between two different positions for alternately closing said two circuits to charge said condenser from said source or to discharge said condenser through said relay, means operable to shift said switch means in each operation of said control means, means operable to adjust the discharge rate of said condenser, and means operable by said relay when the frequency of operation of said control means becomes excessively frequent to initiate reapplication of the brake means and disable said control means.

References Cited in the file of this patent

UNITED STATES PATENTS

| | | |
|---|---|---|
| Re. 22,026 | Wilson | Feb. 10, 1942 |
| 2,232,750 | Wilson | Feb. 25, 1941 |
| 2,232,752 | Wilson | Feb. 25, 1941 |
| 2,272,872 | Wilson | Feb. 10, 1942 |
| 2,320,809 | Wilson | June 1, 1943 |
| 2,329,763 | Hines | Sept. 21, 1943 |
| 2,381,250 | Baumann | Aug. 7, 1945 |
| 2,394,424 | Hines | Mar. 12, 1946 |
| 2,426,575 | Eksergian | Aug. 26, 1947 |
| 2,437,423 | Eksergian | Mar. 9, 1948 |
| 2,530,749 | Yardeny | Nov. 21, 1950 |
| 2,637,416 | Guernsey | May 5, 1953 |